United States Patent [19]
Tanaka et al.

[11] Patent Number: 5,998,049
[45] Date of Patent: Dec. 7, 1999

[54] SILICON NITRIDE CERAMIC HEATER

[75] Inventors: Satoshi Tanaka; Jun Fukuda, both of Kokubu, Japan

[73] Assignee: Kyocera Corporation, Kyoto, Japan

[21] Appl. No.: 08/336,179

[22] Filed: Nov. 8, 1994

[30]  Foreign Application Priority Data

Dec. 11, 1993 [JP] Japan ..................................... 5-283254

[51] Int. Cl.$^6$ ............................... B32B 15/04; H05B 1/10
[52] U.S. Cl. ......................... 428/697; 428/688; 428/698; 219/541; 219/552; 219/553
[58] Field of Search .................... 428/697, 698, 428/699, 688; 219/541, 552, 553

[56]   References Cited

U.S. PATENT DOCUMENTS

| | | | |
|---|---|---|---|
| 4,357,526 | 11/1982 | Yamamoto | 219/544 |
| 4,403,015 | 9/1983 | Nakai | 428/565 |
| 4,613,455 | 9/1986 | Suzuki | 252/516 |
| 4,652,727 | 3/1987 | Hoshizaki | 219/541 |
| 4,690,872 | 9/1987 | Kato | 428/446 |
| 4,804,823 | 2/1989 | Okuda | 219/553 |
| 4,912,305 | 3/1990 | Tatemasu | 219/544 |
| 5,233,166 | 8/1993 | Maeda | 219/552 |

*Primary Examiner*—Fred Teskin
*Attorney, Agent, or Firm*—Loeb & Loeb LLP

[57]  ABSTRACT

A silicon nitride ceramic heater comprising a base body of silicon nitride ceramics, and a heating element embedded in the body, the ceramic heater being characterized in that the element further comprises, as a main ingredient, at least one of carbides, nitrides or silicides selected from the metal group consisting of W, Mo, Re, Cr, Ti, Ta, Ni and Co, and not more than 75 vol % of the BN content in combination with the main ingredient. This composition can reduce the difference in thermal expansion coefficients between the heating element and the silicon nitride ceramics and can thus prevent the heating element from being cracked by thermal stress. Consequently, the silicon nitride ceramic heater is superior in durability and can maintain high performance for a long time.

7 Claims, 2 Drawing Sheets

SILICON NITRIDE CERAMIC HEATER

BACKGROUND OF THE INVENTION

1. Field of the Invention

The present invention relates to a silicon nitride ceramic heater having an excellent heating function and being superior in durability.

2. Prior Art

An alumina ceramic heater with a heating element of high-melting point metal embedded in an alumina ceramic sintered body is generally used as a ceramic heater. However, since alumina is inferior in thermal shock resistance and high temperature strength, a heater intended for use at high temperatures with W, WC, TiN, etc. embedded as a heating element in a silicon nitride ceramic sintered body has been used (refer to Japanese Patent Publication Nos. 62-19034 and 62-59858).

Since a silicon nitride ceramic material is superior in heat resistance, high temperature strength and electrical insulation, and has small heat capacity, it is excellent for use in heaters. For this reason, the above-mentioned silicon nitride ceramic heater is superior in quick heating function, thermal shock resistance and high temperature stability, and is widely used for glow plugs of automobile engines, vaporizers of kerosene fan heaters and other home appliances, electronic devices and industrial machines.

However, the silicon nitride ceramic material has a low thermal expansion coefficient of $3.1 \times 10^{-6}/°C$. On the other hand, heating elements individually made of W, WC and TiN for example have high thermal expansion coefficients of $4.6 \times 10^{-6}/°C$., $5.1 \times 10^{-6}/°C$. and $9.4 \times 10^{-6}/°C$., respectively. Because of this difference, when such a ceramic heater is used at high temperatures and subjected to heating-cooling cycles, the heating element of the heater may become cracked or the electrical resistance thereof may be changed owing to the fatigue caused by the thermal stress generated from the difference in thermal expansion coefficients.

To solve these problems, the operation conditions of the heater must be restricted depending on the thermal expansion coefficient of the heating element, thus causing inconvenience.

SUMMARY OF THE INVENTION

To eliminate the above-mentioned defects of the prior art, the present invention provides a silicon nitride ceramic heater comprising a silicon nitride ceramic sintered body, and a heating element embedded in the body, the ceramic heater being characterized in that the element further comprises, as a main ingredient, at least one of carbides, nitrides or suicides selected from the metal group consisting of W, Mo, Re, Cr, Ti, Ta, Ni and Co, and not more than 75 vol % of BN in combination with the main ingredient.

In the silicon nitride ceramic heater of the present invention, since BN is stable at high temperatures and has a low thermal expansion coefficient of $1.5 \times 10^{-6}/°C$., the thermal expansion coefficient of the heating element can be made closer to that of the silicon nitride ceramics, thereby reducing the difference in thermal expansion coefficients.

In addition, the apparent Young's modulus of the heating element can be reduced by distributing BN in the heating element made of WC, for example, which is high in stiffness, thereby preventing cracking.

As a result, the silicon nitride ceramic heater of the present invention can have higher resistance against heating-cooling cycles, a wider scope of choice for adjusting the thickness of the heating element. In other words, since the present invention makes the thermal expansion coefficient of the heating element closer to that of the base body so that a thicker heating element may cause less cracks therewith, a greater allowance for thickening the element can be obtained. Accordingly, the present invention can provide heaters having large heating areas and heaters capable of heating the heating elements thereof to high temperatures at low voltage.

The examples of the present invention will be described below referring to the accompanying drawings.

DETAILED DESCRIPTION OF THE INVENTION

Figure 1A:
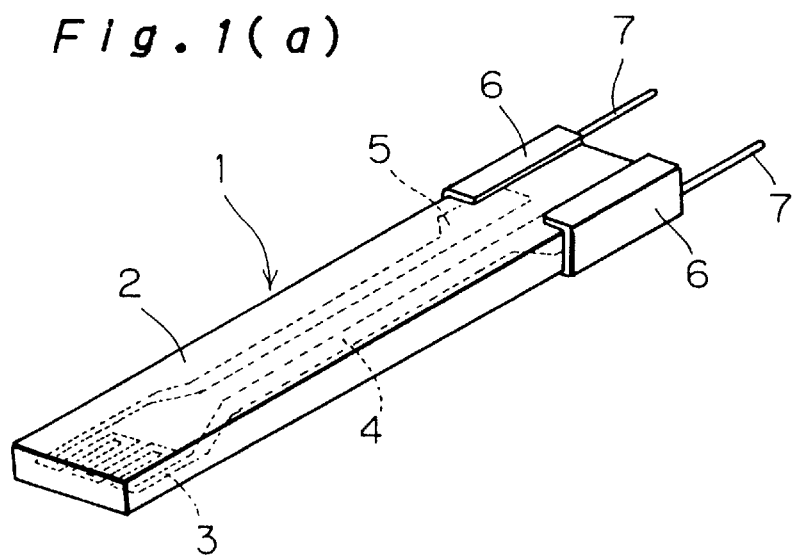
FIG. 1(a) is a perspective view showing an example of a silicon nitride ceramic heater of the present invention.

The heater 1 shown in FIG. 1(a) comprises a heating element 3, a pair of leads 4 and terminals 5 integrated in a base body 2 of silicon nitride ceramics, additionally provided with electrodes 6 and lead wires 7 connected to the terminals 5. By applying voltage across the lead wires 7, the above-mentioned heating element 3 is heated, and the heater can function as a heater.

Figure 1B:
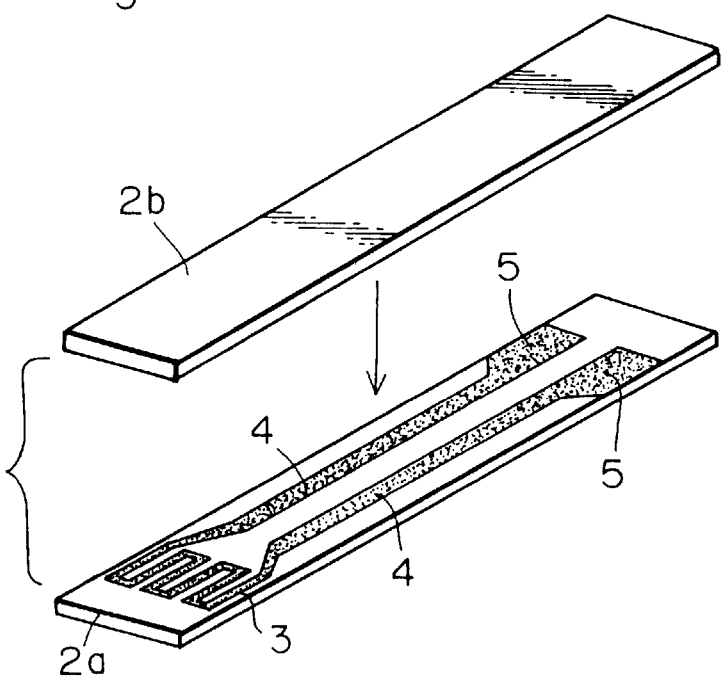
FIG. 1(b) is a perspective view showing a method of making the example.

The method of making this heater 1 is described below. First, as shown in FIG. 1(b), conductive paste is printed on a green molded body 2a of silicon nitride by screen printing to integrally form the heating element 3, the leads 4 and the terminals 5 on the green molded body 2a. Next, another green molded body with no printed pattern 2b is laminated over these patterns. This lamination is fired into one body by a hot pressing method or the like and then ground to predetermined dimensions. The terminals exposed outside are metalized and connected to the electrodes 6. In this way, the heater 1 can be produced.

Figure 2:
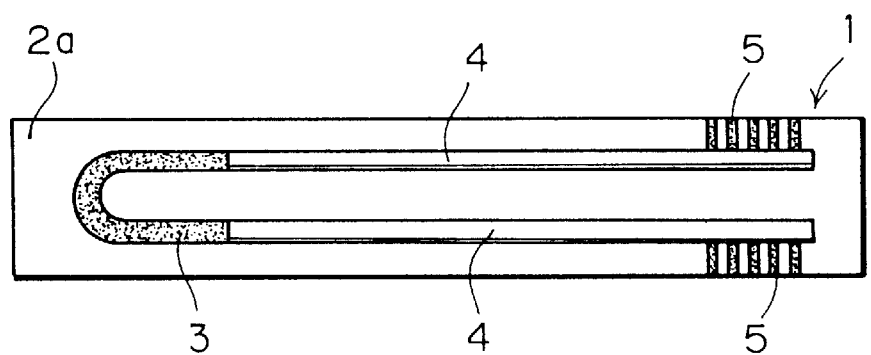
FIG. 2 is a plan view showing the internal patterns of another example of a silicon nitride ceramic heater of the present invention.

FIG. 2 shows another example of the present invention. This heater 1 is produced as described below. The heating element 3 is formed by printing conductive paste including BN on the green molded body 2a of silicon nitride. High-melting point metal wires, such as tungsten wires, are provided as the leads 4 connected to the heating element 3. As the terminals 5, comb-shaped patterns are formed by printing the conductive paste. In the same method as that for the above-mentioned example, another green molded body is laminated over the above-mentioned components and the lamination is fired into one body to obtain the heater 1.

In the example shown in FIG. 2, heat generation at the leads 4 can be prevented by enlarging the ratio of resistance between the leads 4 of high-melting point metal wires and the heating element 3. In addition, by making the terminals 5 in a comb-shape, the terminals 5 can be securely connected to the electrodes 6.

In the heater 1 embodied in the examples of the present invention, the conductive paste used for the heating element 3 comprises, as a main ingredient, at least one of carbides, nitrides or suicides selected from the metal group consisting of W, Mo, Re, Cr, Ti, Ta, Ni and Co, and not more than 75 vol % of BN in combination with the main ingredient. Since BN has a low thermal expansion coefficient of $1.5 \times 10^{-6}/°C$., the thermal expansion coefficient of the heating element 3 can be lowered by distributing BN in the heating element 3, thereby reducing the difference in thermal expansion coefficients between the heating element 3 and the base body 2 of silicon nitride ceramics. Furthermore, by distributing BN in the heating element 3 made of WC, for example, which is high in stiffness, the apparent Young's modulus of the heating element 3 can be reduced, thereby preventing cracking.

Since BN is an electric insulator, if the BN content in the heating element 3 is too high, the resistance value thereof may be raised excessively or varied inside the element 3. The BN content in the heating element 3 is, therefore, determined to not more than 75 vol %. On the other hand, if the BN content is too low, the above-mentioned effects are not achieved sufficiently. Accordingly, the BN content in the heating element 3 should preferably be not less than 20 vol %.

To evenly distribute BN in the heating element 3, the grain diameter of BN is an important factor to be considered. The average grain diameter of BN should be 18 μm or less, preferably 10 μm or less, and more preferably 5 μm or less.

When integrally forming the heating element 3, the leads 4 and the terminals 5 as shown in FIG. 1(a), they should be better formed by using the same conductive paste, and the leads 4 and the terminals 5 should be made wide to have lower resistance values. In FIG. 2, the BN content in the terminals 5, although formed by using the same conductive paste as that for the heating element 3, may be not more than 20 vol %. One of carbides, nitrides or suicides selected from the metal group consisting of W, Mo, Re, Cr, Ti, Ta, Ni and Co, used as a main ingredient of the heating element 3, is not necessarily a starting material, but it can be such one as is formed during the firing of a non-reacted single metal used as a starting material, so that the finally sintered body has such a compound therein.

The silicon nitride ceramic material for the base body 2, comprises, for example, not less than 80 weight % of $Si_3N_4$, having acicular crystals with an aspect ratio of 2 or more, and including $Al_2O_3$ and oxides of rare earth elements, such as $Y_2O_3$, used as sintering aids.

Although the heater 1 embodied in the above-mentioned examples is shown only in a plate shape, it is needless to say that the heater 1 can have various shapes, such as rod and cylindrical shapes. The silicon nitride ceramic heater of the present invention thus obtained can be used suitably for home appliances, electronic devices, industrial machines, automobiles and other apparatuses in various fields.

<Performance Test>

EXPERIMENT EXAMPLE 1

A plurality of samples of the heater 1 shown in FIG. 1 were made on trial and subjected to a durability test as described below.

First, the materials having the compositions listed in Table 1 were each mixed with a predetermined cellulose-based binder and a solvent, and stirred for 72 hours by a vibrating mill to prepare various kinds or conductive pastes. After adjusting the viscosity of the conductive paste to a specified value, the conductive paste was printed on the green molded body 2a of silicon nitride to a predetermined thickness by screen printing as shown in FIG. 1(b) to form the heating element 3, the leads 4 and the terminals 5. Over the molded body 2a, the other green molded body 2b was laminated and the lamination was fired by hot pressing. The obtained sintered body was then ground to predetermined dimensions. The terminals 5 partially exposed outside the surface of the lamination was metalized and connected to the electrodes 6. In this way, the heater 1 was produced.

The thermal expansion coefficient, Young's modulus and electrical resistivity of each sample of the heating element 3 were measured in a range between room temperature and 1000° C. In addition, each sample of the heater 1 was subjected to 20,000 heating-cooling cycles wherein each cycle consisted of a heating period of 30 seconds in which the heater was heated from room temperature to 1400° C. and an air-cooling period of 60 seconds in which the heater was cooled to room temperature. The samples were checked for the presence/absence of cracks and durability.

The results of the test are shown in Table 2, wherein samples which caused cracks are marked X. samples which (lid not cause cracks are marked ○. Regarding durability, samples having not less than 20% the rate of change in electrical resistivity after heating-cooling cycles are marked x, samples having not less than 10% and less than 20% of the rate of change are marked Δ and samples having less than 10% of the rate of change are marked ○. The thickness of the heater 3 was set to 40 to 50 μm, except that the thickness was set to 15 μm in the case of samples Nos. 14 to 22.

TABLE 1

| Sample No. | Main ingredient of heating element | | BN content | | Grain diameter of BN |
|---|---|---|---|---|---|
| | | (wt %) | (wt %) | (vol %) | (μm) |
| 1 | WC | 100 | 0 | 0 | 2.0 |
| 2 | WC | 98 | 2 | 12.5 | " |
| *3 | WC | 95 | 5 | 26.9 | " |
| 4 | WC | 90 | 10 | 43.7 | " |
| 5 | WC | 85 | 15 | 55.2 | " |
| 6 | WC | 80 | 20 | 63.6 | " |
| 7 | WC | 75 | 25 | 69.9 | " |
| 8 | WC | 70 | 30 | 75.0 | " |
| *9 | WC | 60 | 40 | 82.3 | " |
| 10 | WC | 85 | 15 | 55.2 | 1.0 |
| 11 | WC | " | " | " | 3.0 |
| 12 | WC | " | " | " | 18.0 |
| 13 | WC | " | " | " | 56.0 |
| 14 | $WSi_2$ | 90 | 10 | 32.6 | 2.0 |
| 15 | $WSi_2$ | 85 | 15 | 43.5 | " |
| 16 | $WSi_2$ | 80 | 20 | 52.2 | " |
| 17 | TiN | 90 | 10 | 21.2 | 2.0 |
| 18 | TiN | 85 | 15 | 29.8 | " |
| 19 | TiN | 80 | 20 | 37.6 | " |
| 20 | $MoSi_2$ | 90 | 10 | 23.5 | 2.0 |
| 21 | | 85 | 15 | 32.8 | " |
| 22 | WC 50 + TiN | 35 | 15 | 40.8 | 2.0 |
| 23 | WC 73 + Re | 12 | 15 | 56.1 | " |
| 24 | WC 79 + Re | 6 | 15 | 55.6 | " |
| 25 | WC 77 + Re | 13 | 10 | 44.6 | " |
| 26 | WC 82 + Re | 13 | 5 | 27.6 | " |
| 27 | WC 73 + $ReSi_2$ | 12 | 15 | 54.4 | " |

Note: The samples marked * are out of the scope of the present invention.

TABLE 2

| Sample No. | Thermal expansion coefficient ($\times 10^{-6}$/° C.) | Young's modulus ($\times 10^6$ kg/cm$^2$) | Electrical resistivity ($\Omega\ \mu$m) | Crack | Durability |
| --- | --- | --- | --- | --- | --- |
| *1  | 5.1 | 7.0 | 0.49 | ○ | X |
| 2   | 4.6 | 6.1 | 0.54 | ○ | X |
| 3   | 4.1 | 5.1 | 0.70 | ○ | Δ |
| 4   | 3.5 | 3.9 | 1.3  | ○ | ○ |
| 5   | 3.1 | 3.1 | 2.1  | ○ | ○ |
| 6   | 2.8 | 2.5 | 4.0  | ○ | ○ |
| 7   | 2.6 | 2.1 | 9.8  | ○ | ○ |
| 8   | 2.4 | 1.8 | 20.5 | ○ | ○ |
| *9  | 2.3 | 1.2 | ∞    | ○ | — |
| 10  | 3.0 | 3.0 | 2.3  | ○ | ○ |
| 11  | 2.7 | 3.1 | 2.1  | ○ | ○ |
| 12  | 2.6 | 3.1 | 2.1  | ○ | Δ |
| 13  | 3.2 | 3.1 | 2.1  | X | X |
| 14  | 5.8 | —   | 11.8 | ○ | ○ |
| 15  | 5.2 | —   | 14.2 | ○ | ○ |
| 16  | 4.6 | —   | 16.7 | ○ | ○ |
| 17  | 7.7 | —   | 3.2  | ○ | ○ |
| 18  | 7.0 | —   | 3.6  | ○ | ○ |
| 19  | 6.4 | —   | 4.0  | ○ | ○ |
| 20  | 6.7 | —   | 6.3  | ○ | ○ |
| 21  | 6.0 | —   | 7.2  | ○ | ○ |
| 22  | 5.1 | —   | 2.8  | ○ | ○ |
| 23  | 2.7 | —   | 8.0  | ○ | ○ |
| 24  | 2.6 | 3.1 | 6.0  | ○ | ○ |
| 25  | 3.2 | 3.9 | 6.5  | ○ | ○ |
| 26  | 3.7 | 5.1 | 5.0  | ○ | Δ |
| 27  | 2.8 | 3.2 | 7.5  | ○ | ○ |

Note: The samples marked * are out of the scope of the present invention.

According to these results, it is clearly found that, although sample No. 1 not including BN is inferior in durability, samples Nos. 2 to 8 including BN is able to lower the thermal expansion coefficients so as to prevent each from being cracked and to have higher durability. However, sample No. 9 including more than 75 vol % of BN had excessive electrical resistivity and can not be used as a heater. For this reason, it is found that the upper limit of the BN content is 75 vol %. Furthermore, if BN has an excessively large grain diameter of 56.0 μm in the case of sample No. 13, it is found that cracking occurred and durability is lowered. However, when the average grain diameter is 18 μm in the case of sample No. 12, no problem occurred. It is thus also found that the upper limit of the average grain diameter is 18 μm.

Moreover, when samples Nos. 23 to 26 additionally including Re were evaluated by X-ray diffraction, it was found that Re had been changed to Re$_5$Si$_3$. When the samples were analyzed by EPMA, it was confirmed that Re had been segregated and Si had also been segregated at the segregated areas of Re in samples Nos. 23, 25 and 26. In other words, it is found that even if Re, a single metal, is used as a starting material, its silicide is finally formed and the silicide content is within the range of the main ingredient of the present invention.

EXPERIMENT EXAMPLE 2

Next, in the same way as the above-mentioned experiment example, samples were examined in durability under the conditions that the main ingredients of the heating element 3 were limited to WC and Re, and the BN content and the average grain diameter of BN were changed variously.

Figure 3:
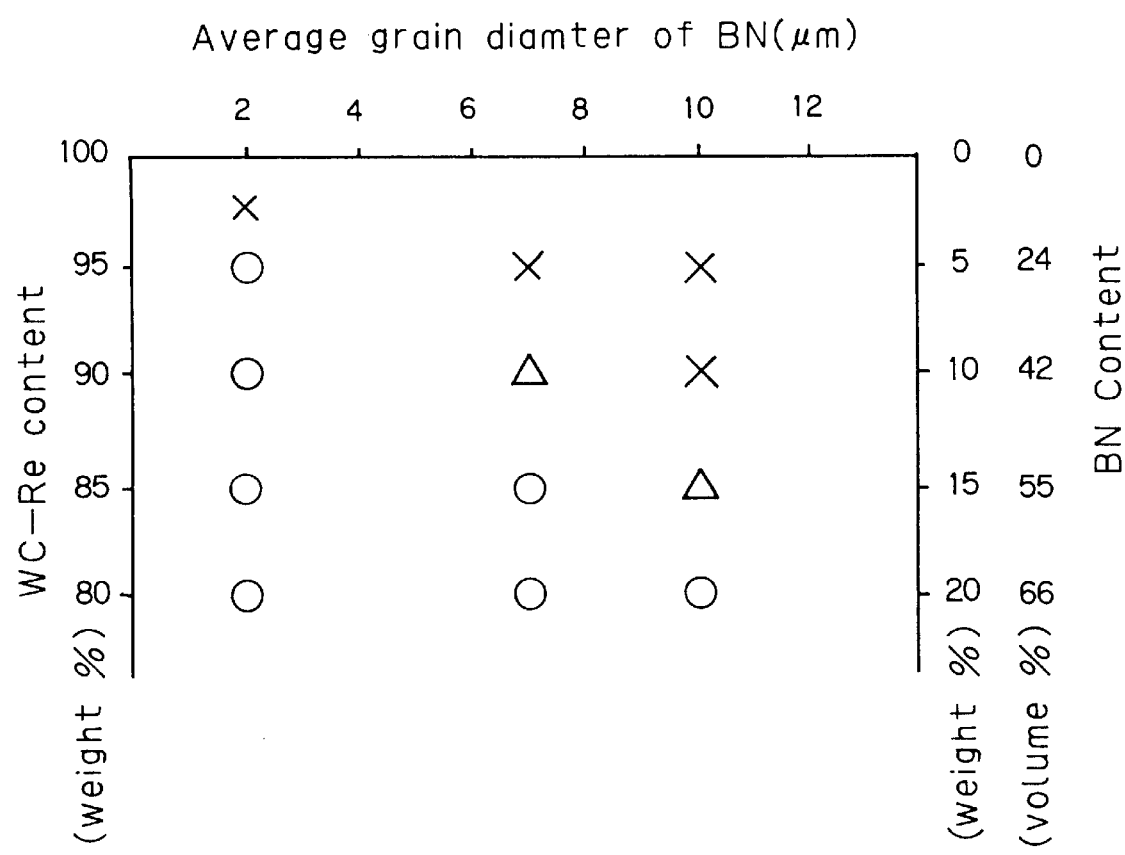
FIG. 3 is a diagram giving comparisons of various samples of the silicon nitride ceramic heater of the present invention in terms of durability depending on the BN content and the grain diameter of BN.

Each sample of the heater 1 was subjected to 500 heating-cooling cycles wherein each cycle consisted of a heating period of 60 seconds in which the heater was heated from room temperature to 1400° C. and an air-cooling period of 60 seconds in which the heater was cooled to room temperature. Samples having not more than 0.5% of the rate of change in resistance after the heating-cooling cycles are marked ○, samples having the rate of change in the range of 0.5 to 1% are marked Δ, and samples having not less than 1% of the rate of change are marked x. This evaluation standard is severer in the rate of change in resistance than that applied to Experiment Example 1 described above. The results are shown in FIG. 3.

According to the results, it is observed that higher durability is obtained when the average grain diameter of BN is 10 μm or less. Additionally, it is also found that as the average grain diameter of BN is made smaller, the BN content can be made lower and that the BN content can have a low value of 5 weight % (24 vol %) provided that the grain diameter was 2 μm.

As described above, the silicon nitride ceramic heater of the present invention makes it possible to reduce the difference in thermal expansion coefficients between the heating element and the silicon nitride ceramics body, to thereby prevent the heating element from being cracked by thermal stress. As a result, the present invention can provide a ceramic heater superior in durability and capable of maintaining high performance for a long time.

We claim:

1. A silicon nitride ceramic heater, comprising:
    a silicon nitride ceramic sintered body, and
    a heating element embedded in the body, the heating element comprising, as a main ingredient, at least one of carbides, nitrides or silicides selected from the metals W, Mo, Re, Cr, Ti, Ta, Ni and Co, and an amount of BN, the amount of BN being not greater than 75 vol % of BN in combination with the main ingredient, the BN having an average grain diameter of not greater than 18 μm.

2. A silicon nitride ceramic heater, comprising:
    a base body of silicon nitride ceramics,
    an inner heating element,
    a conductive paste forming a pair of leads and partially exposed terminals in the base body, the conductive paste comprising, as a main ingredient, at least one of carbides, nitrides or silicides selected from the metals W, Mo, Re, Cr, Ti, Ta, Ni and Co, and an amount of BN, the amount of BN being not greater than 75 vol % of BN in combination with the main ingredient, the BN having an average grain diameter of not greater than 18 μm.

3. The silicon nitride ceramic heater of claim 1 or 2, wherein the BN has an average grain diameter not greater than 10 μm.

4. The silicon nitride ceramic heater of claim 1 or 2, wherein the BN has an average grain diameter not greater than 5 μm.

5. The silicon nitride ceramic heater of claim 1 or 2, wherein the BN content is in the range of 20 to 75 vol %.

6. The silicon nitride ceramic heater of claim 1 or 2, wherein the main ingredient comprises WC.

7. The silicon nitride ceramic heater of claim 2, wherein one of the carbides, nitrides or silicides is formed by firing a green base body from a single metal used as a starting material in the conductive paste.

* * * * *